United States Patent
Locke

(10) Patent No.: US 10,462,187 B2
(45) Date of Patent: *Oct. 29, 2019

(54) NETWORK SECURITY POLICY CONFIGURATION BASED ON PREDETERMINED COMMAND GROUPS

(71) Applicant: General Electric Company, Schenectady, NY (US)

(72) Inventor: Roderick Locke, Vancouver (CA)

(73) Assignee: General Electric Company, Schenectady, NY (US)

( * ) Notice: Subject to any disclaimer, the term of this patent is extended or adjusted under 35 U.S.C. 154(b) by 131 days.

This patent is subject to a terminal disclaimer.

(21) Appl. No.: 15/688,705

(22) Filed: Aug. 28, 2017

(65) Prior Publication Data

US 2019/0068643 A1 Feb. 28, 2019

(51) Int. Cl.

| H04L 29/00 | (2006.01) |
| H04L 29/06 | (2006.01) |
| G06F 21/53 | (2013.01) |
| H04L 29/08 | (2006.01) |
| G06F 21/50 | (2013.01) |
| H04L 12/26 | (2006.01) |

(52) U.S. Cl.
CPC .............. *H04L 63/20* (2013.01); *G06F 21/53* (2013.01); *H04L 63/0245* (2013.01); *H04L 63/0263* (2013.01); *H04L 63/101* (2013.01); *H04L 63/104* (2013.01); *H04L 63/1425* (2013.01); *H04L 67/12* (2013.01); *G06F 21/50* (2013.01); *H04L 43/06* (2013.01)

(58) Field of Classification Search
CPC . H04L 63/20; H04L 63/1425; H04L 63/0263; H04L 63/104; H04L 43/06; H04L 63/0245; H04L 63/101; H04L 67/12; G06F 21/50; G06F 21/53

See application file for complete search history.

(56) References Cited

U.S. PATENT DOCUMENTS

| 6,529,998 B1 * | 3/2003 | Yochai ................ G06F 12/0862 711/137 |
| 7,421,498 B2 * | 9/2008 | Packer ................ G06F 16/9535 709/225 |
| 8,204,984 B1 * | 6/2012 | Aziz ................... H04L 63/0227 709/224 |
| 9,483,186 B1 * | 11/2016 | Lewis ..................... G06F 3/061 |
| 9,779,222 B2 * | 10/2017 | Borkar ................... G06F 21/10 |
| 10,218,725 B2 * | 2/2019 | Kim .................... H04L 63/1458 |

(Continued)

*Primary Examiner* — Don G Zhao
(74) *Attorney, Agent, or Firm* — Fitch Even Tabin & Flannery LLP

(57) ABSTRACT

A network security system monitors, during a time period, data traffic transmitted between devices in a network to identify a plurality of commands transmitted between the devices. The network security system determines, from the plurality of commands, a first set of commands that were transmitted between a first device and a second device in the network. The network security system determines that the first set of commands includes a threshold number of commands from a first predetermined command group of a plurality of predetermined command groups. Each predetermined command group includes a listing of commands. The network security system generates a first policy based on the first predetermined command group.

20 Claims, 8 Drawing Sheets

(56) References Cited

U.S. PATENT DOCUMENTS

| | | | |
|---|---|---|---|
| 2005/0251804 A1* | 11/2005 | Musta | G06F 9/542 |
| | | | 718/100 |
| 2013/0086237 A1* | 4/2013 | Cutler | H04L 41/0893 |
| | | | 709/223 |
| 2016/0210578 A1* | 7/2016 | Raleigh | G06Q 10/06375 |
| 2017/0013017 A1* | 1/2017 | Chen | H04L 63/20 |
| 2017/0181070 A1* | 6/2017 | Gupta | H04W 28/08 |
| 2017/0279717 A1* | 9/2017 | Bethers | H04L 45/748 |
| 2018/0052914 A1* | 2/2018 | Allen | G06F 17/2211 |

* cited by examiner ary systems and methods for net-
work security policy configuration based on predetermined
command groups.

NETWORK SECURITY POLICY CONFIGURATION BASED ON PREDETERMINED COMMAND GROUPS

TECHNICAL FIELD

The present disclosure generally relates to the technical field of special-purpose machines that facilitate network security, including computerized variants of such special-purpose machines and improvements to such variants, and to the technologies by which such special-purpose machines become improved compared to other special-purpose machines that facilitate network security. In particular, the present disclosure addresses systems and methods for network security policy configuration based on predetermined command groups.

BACKGROUND

Most people are familiar with the term Information Technology (IT), which covers the spectrum of technologies for information processing, including software, hardware, communications technologies and related services. Operation Technology (OT) is a relatively newer term that refers to hardware and software that detects or causes a change through the direct monitoring and/or control of physical devices, processes and events in the enterprise. For example, OT networks interconnect industrial control systems such as programmable logic controllers, supervisory control and data acquisition systems, distributed control systems, process control domains, safety instrumented systems, and building management and automation systems.

As many organizations are discovering, the Industrial Internet is a huge new opportunity for growth and efficiency. To realize this value, OT environments need to be connected. With production systems becoming more interconnected, the exposure to cyber incidents increases. Attacks and disruptions on critical infrastructure put reputation, production, people, and profits at risk.

Traditionally, OT networks have operated separately from IT networks. For example, OT networks utilized proprietary protocols optimized for the required functions, some of which have become adopted as 'standard' industrial communications protocols (e.g., DNP3, Modbus, Profibus, RTU, CANBUS, HART, DeviceNet). More recently, IT-standard network protocols are being implemented in OT devices and systems to reduce complexity and increase compatibility with more traditional IT hardware (e.g., TCP/IP). This has led to a demonstrable reduction in security for OT systems.

Network security systems are designed to protect critical infrastructure, control systems and OT assets. Network security systems provide protection from cyber threats and vulnerabilities in OT environments by monitoring and blocking malicious activity and misconfiguration to promote OT safety and protect productivity. While effective, configuring a network security system is a difficult and time intensive manual task. For example, a network administrator is often tasked with manually generating whitelist policies that identify commands that should be allowed within the network. This requires the network administrator to analyze the software services running on the devices in the network and determine the commands that are likely to be transmitted to provide the software services. Accordingly, improvements are needed.

BRIEF DESCRIPTION OF THE DRAWINGS

The drawings illustrate example embodiments of the present disclosure and do not limit the scope of the present disclosure.

DETAILED DESCRIPTION

Figure 1:
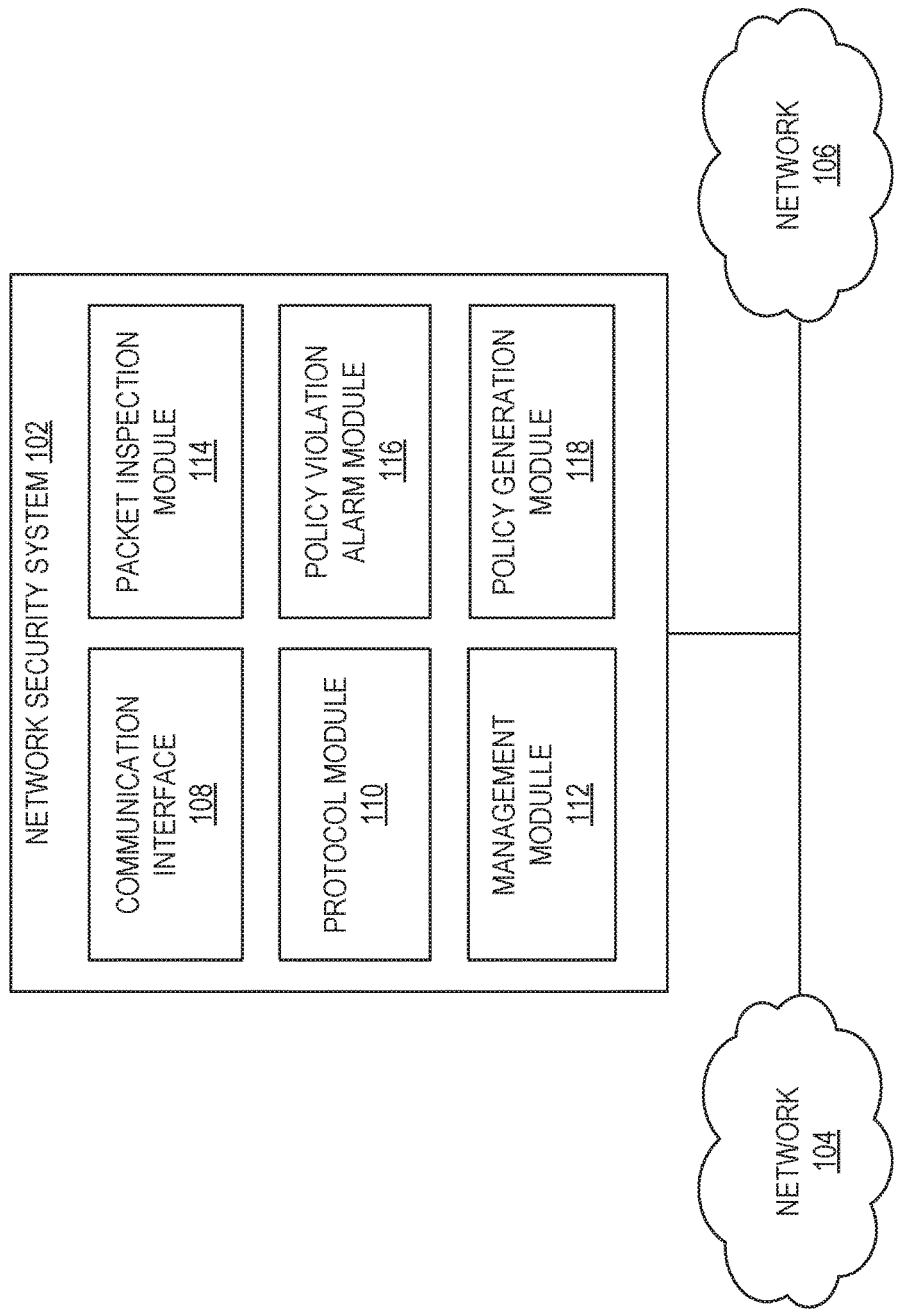
FIG. 1 is a block diagram of a network security system, according to some example embodiments.

Network security systems, such as network firewalls, network security devices, etc., establish a barrier between a trusted secure network and an outside network (e.g., the Internet) that is assumed to be unsecure or untrusted. The network security system monitors and controls incoming and outgoing network traffic between the secured network and the outside network based on a set of predetermined security policies (e.g., rules). For example, a network security system includes a packet inspection engine that analyzes incoming and outgoing data packets based on the set of predetermined security policies. The network security system forwards approved data packets towards their intended destination, while blocking data packets that are not approved.

One example policy used by a network security system is a whitelisting policy. A whitelisting policy includes a list or register that identifies data traffic that should be allowed to pass to its intended recipient. For example, a whitelisting policies identifies data packets that should be allowed based on a source and/or destination computing node, source and/or destination IP address, application-layer commands, etc. Whitelisting policies are generally generated by a network administrator that manually adds individual commands to the list or register. This process is time consuming and requires constant updating as the administrator identifies additional commands to add to the list.

To alleviate this issue, a network security system uses predetermined command groups to apply policies to a network. A predetermined command group includes a listing of related commands that can be added to a whitelisting policy. For example, each predetermined command group may include separate categories of commands, such as read commands, write commands, administer commands, etc. Rather than an administrator individually adding commands to the whitelisting policy, the network security system generates a whitelisting policy based on a predetermined command group. For example, the network security system adds the commands in the predetermined command group to the whitelisting policy.

To determine which predetermined command groups to use for whitelisting policies, the network security system initially monitors data traffic transmitted between devices in the network for a period of time. For example, the devices in the network are executed in a sandboxed testing environment for a period of time during which the devices communicate with each other to provide a set of software services. The network security system monitors the data traffic during this period of time and gathers network data describing a plurality of commands transmitted between the devices as well as metadata describing the individual commands (e.g., source IP, destination IP, command type, time, etc.).

The network security system analyzes this monitored network data and identifies sets of commands that were transmitted between specific devices and/or groups of devices in the network. The network security system then analyzes the predetermined command groups based on the identified sets of commands to identify a predetermined command group that includes commands transmitted between the devices. For example, the network security device determines whether a predetermined command group includes a threshold number of the commands transmitted between the devices. If a predetermined command group is identified, the network security system generates a whitelisting policy based on the predetermined command group. For example, the network security system adds the commands in the predetermined command group to the whitelisting policy.

The following figures describe example embodiments, example environments of example embodiments, and example aspects thereof.

FIG. 1 is a block diagram of a network security system 102, according to some example embodiments. To avoid obscuring the inventive subject matter with unnecessary detail, various functional components (e.g., modules) that are not germane to conveying an understanding of the inventive subject matter have been omitted from FIG. 1. However, a skilled artisan will readily recognize that various additional functional components may be supported by the network security system 102 to facilitate additional functionality that is not specifically described herein. Furthermore, the various functional modules depicted in FIG. 1 may reside on a single computing device (e.g., a network security device) or may be distributed across several computing devices in various arrangements such as those used in cloud-based architectures. Further, the various functional modules, engines, etc., depicted in FIG. 1 may be implemented as either a physical network security device, or, alternatively, a virtual network security device.

As shown, the network security system 102 is connected to both network 104 and network 106. For example, the network security system 102 can be connected to network 104 and network 106 via a traffic tap, respective inline traffic connections, etc.

Network 104 and network 106 may include both an IT network and an OT network. For example, network 104 and network 106 may include a combination of traditional IT devices (e.g., computer servers, laptops, mobile computing devices, etc.), and OT devices (e.g., industrial machinery, valves, pumps, etc.).

The network security system 102 establishes a barrier between a trusted secure network (i.e., network 104) and an outside network (e.g., the Internet) that is assumed to be unsecure or entrusted (i.e., network 106). To accomplish this, the network security system 102 monitors and controls incoming and outgoing network traffic between the secured network 104 and the outside network 106 based on a set of predetermined security rules, policies, etc.

As shown, the network security system 102 includes a communication interface 108, a protocol module 110, a management module 112, a packet inspection module 114, a policy violation alarm module 116, and a policy generation module 118.

The communication interface 108 includes physical and/or software components to read traffic from and send traffic to both the network 104 and the network 106. For example, the communication interface 108 receives a communication, such as a request, data, etc., from a computing device in network communication with the network security system 102 and passes the communication along to an appropriate module of the network security system 102. The communication interface 108 also sends a communication to another computing device in network communication with the network security system 102. For example, the communication interface 108 receives communications from a device in network 104 that is intended for a recipient device in network 106, and then transmits the received communication to its intended recipient device in network 106.

The protocol module 110 processes read traffic received from device in the networks 104 and 106 to extract commands and responses of an OT protocol such as Modbus, DNP3, IEC 60870, BACnet, LonWorks, EPICS, any other SCADA protocol, and any other OT protocol. The protocol module 110 also processes commands and responses of an OT protocol and generates traffic to send to its intended destination.

The management module 112 controls and monitors the network security system 102. One function of the management module 112 includes implementing network security configurations that define performance of the network security system. For example, the network security configurations include security policies, such as whitelisting policies, that define rules for data traffic that is allowed to pass to its intended recipient. Whitelisting policies includes a list or register that identifies data traffic that should be allowed to pass to its intended recipient. For example, the whitelisting policies identify data packets that should be allowed based on a source and/or destination computing node, IP address, command type, protocol type, etc.

The packet inspection module 114 analyzes data traffic received by the network security system 102 based on the security policies (e.g. rules). In one example, the packet inspection module 114 determines whether data traffic is allowed based on the whitelisting policies. For example, the packet inspection module 114 identifies a destination and source IP address associated with the data packet as well as a command type. The packet inspection module 114 then determines whether the particular data communication is listed in the whitelisting policies, indicating that the data packet should be allowed to continue to its intended recipient.

The packet inspection module 114 may also implement other deep packet inspection techniques where each data packet is dissected into component protocols and filtered based on the security policies. In one example embodiment, a protocol targets a specific controller or group of controllers. For example, in the healthcare industry, the DICOM protocol is used to transport information between medical imaging devices such as MRI machines and workstations or file servers. In one example of a security policy, the packet inspection module 114 blocks or alerts on certain operations such as reading a patient file or CAT scan from a specific workstation to a file server.

Example security policies can be based on a variety of factors, such as an inbound traffic rate, a traffic protocol, a traffic pattern, etc. The packet inspection module 114 may apply a single security policy or multiple security policies to a data packet. Additionally, the security policy or policies may change over time or according to another condition.

An example of a security policy based on a traffic pattern is allowing or blocking data packets based on the source endpoint and/or a destination endpoint of the data traffic. For example, a security policy may allow traffic originating from workstation A (or multiple workstations A) and no other endpoints, only the traffic reaching workstation B (or multiple workstations B) and no other endpoints, or both. Other example security policies are based on a URI, content (a word or phrase), a user's IP address, a user's MAC address, etc.

The policy violation alarm module 116 executes a remedial action in response to a violation of a policy. Example remedial actions include transmitting a notification to a user for user intervention, as well as a suggestion of a new whitelisting policy to allow more network traffic. In an in-line configuration, another example of a remedial action is to block network traffic.

The policy generation module 118 generates whitelisting policies based on predetermined command groups. A predetermined command group includes a listing of related commands that can be added to a whitelisting policy. For example, each command group may include separate categories of commands, such as read commands, write commands, administer commands, etc. The predetermined command groups can be generated by a user, such as an administrator.

Once the predetermined command groups are created, the policy generation module 118 uses the predetermined command groups to generate a whitelisting policy rather than an administrator individually adding commands to the whitelisting policy. For example, the policy generation module 118 determines an appropriate predetermined command group for devices in the network and then add the commands in the predetermined command group to the whitelisting policy.

To determine which predetermined command groups to use for whitelisting policies, the policy generation module 118 initially monitors data traffic transmitted between devices in networks 104 and 106 for a period of time. For example, the devices in the networks 104 and 106 are executed in a sandboxed testing environment for a period of time during which the devices communicate with each other to provide a set of software services. The policy generation module 118 monitors the data traffic during the period of time and gathers network data that describes a plurality of commands transmitted between the devices as well as metadata describing the individual commands (e.g., source IP, destination IP, command type, time, etc.).

The policy generation module 118 analyzes the network data and identifies sets of commands that were transmitted between specific devices and/or groups of devices. The policy generation module 118 then analyzes the predetermined command groups based on the identified sets of commands to identify predetermined command groups that include commands transmitted between the devices. For example, the policy generation module 118 determines whether a predetermined command group includes a threshold number of the commands transmitted between the devices. If a predetermined command group is identified, the policy generation module 118 generates a whitelisting policy based on the predetermined command group. For example, the policy generation module 118 adds the commands in the predetermined command group to the whitelisting policy, thereby allowing all of the commands listed in the predetermined command group to be transmitted between the devices. The policy generation module 118 is described in greater detail below in relation to FIG. 3.

Figure 2:
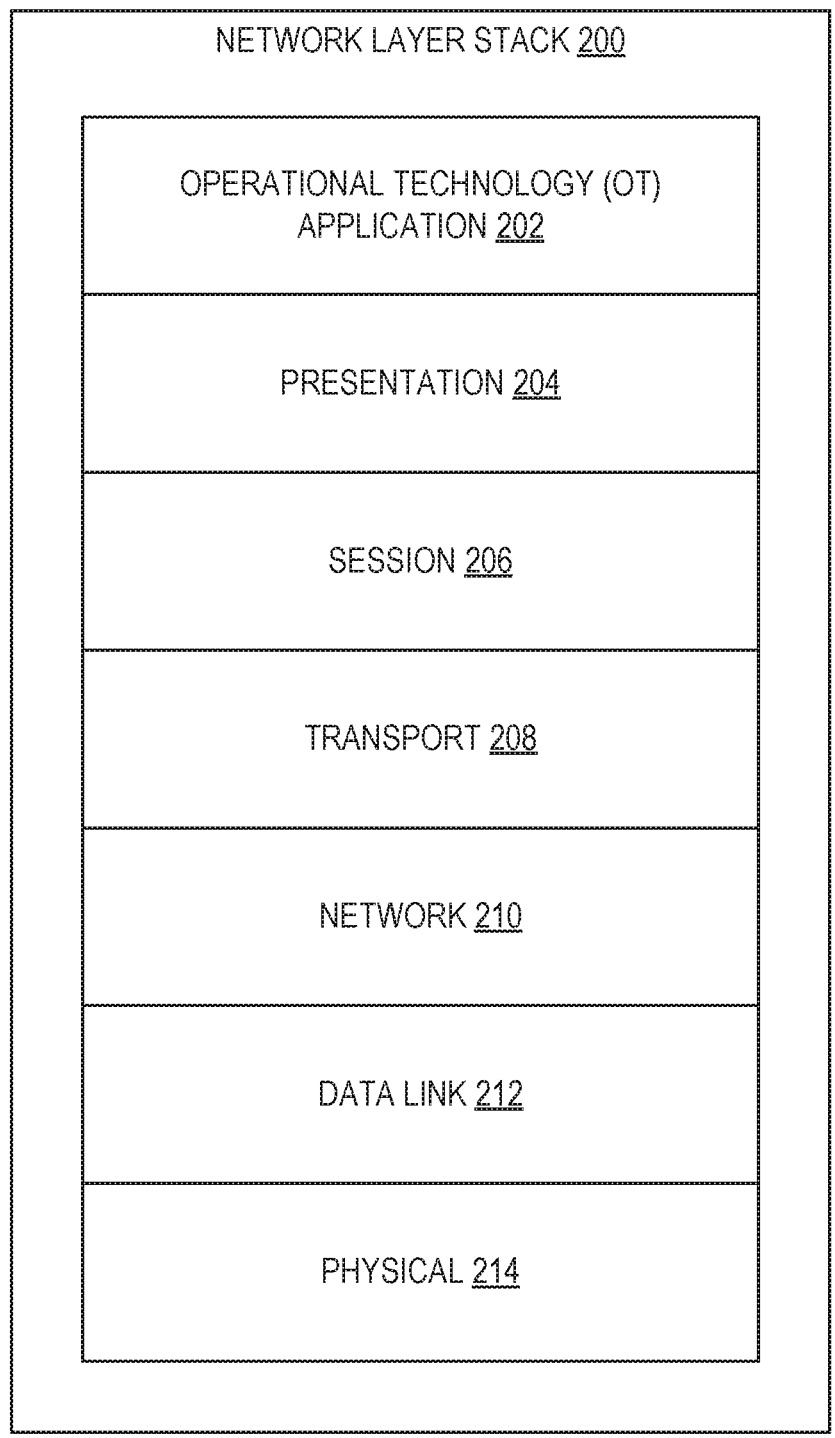
FIG. 2 is a diagram of a network layer stack, according to some example embodiments.

FIG. 2 is a diagram of a network layer stack 200, according to some example embodiments. The layers in the network layer stack 200 include an OT application layer 202, a presentation layer 204, a session layer 206, a transport layer 208, a network layer 210, a data link layer 212, and a physical layer 214. An example OT protocol borrows some aspects from an IT protocol, but modifies others. For example, the health care Digital Imaging and Communications in Medicine (DICOM) protocol uses a network stack with Ethernet, Internet Protocol, Transmission Control Protocol, and DICOM layers.

Figure 3:
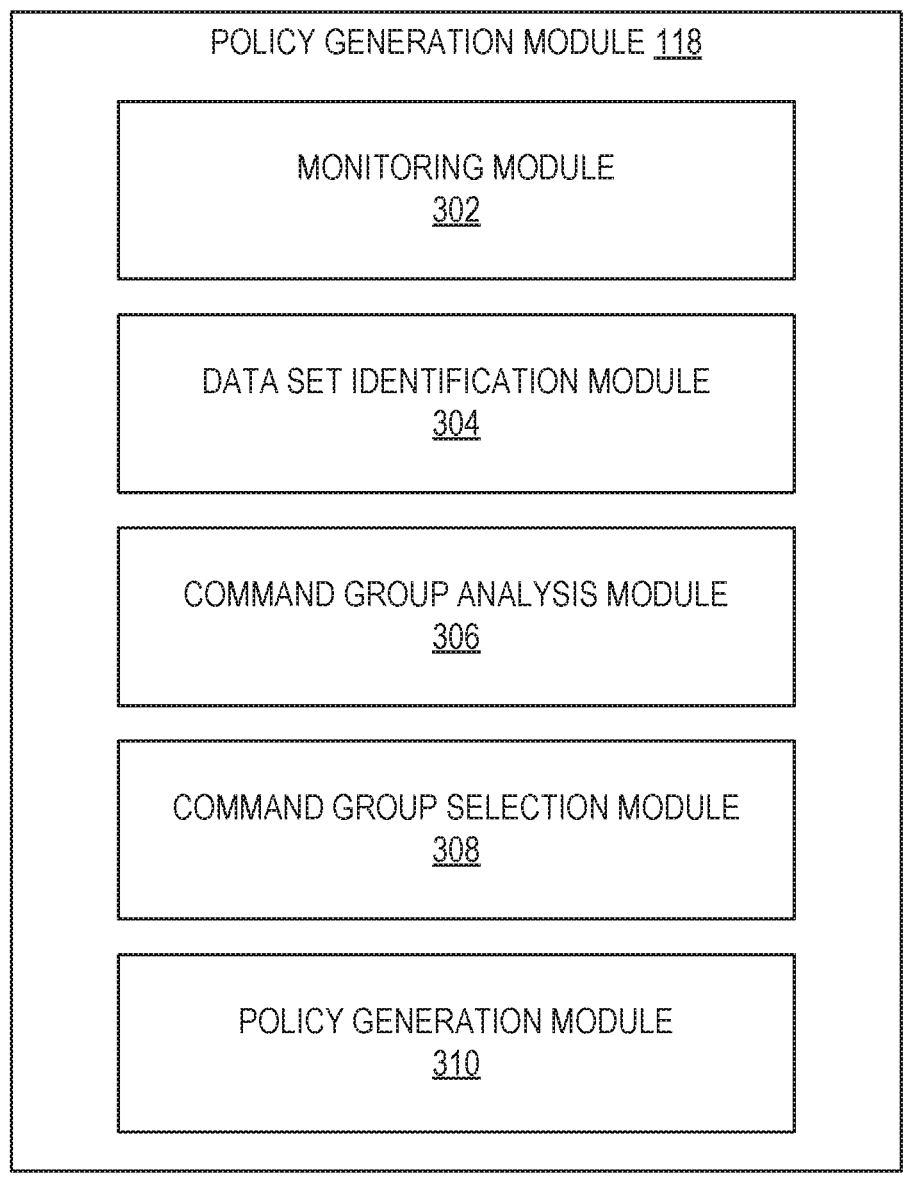
FIG. 3 is a block diagram of policy generation module, according to some example embodiments.

FIG. 3 is a block diagram of the policy generation module 118, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the policy generation module 118 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the policy generation module 118 includes a monitoring module 302, a data set identification module 304, a command group analysis module 306, a command group selection module 308, and a policy generation module 310.

The monitoring module 302 monitors network traffic and generates monitored network data. Network traffic includes data packets transmitted from devices in both networks 104 and 106. The data packets are transmitted as the devices communicate with each other to provide services, such as software services. For example, the data packets represent commands transmitted from one device to another device, such as read, write or administer commands.

The monitoring module 302 analyzes the data packets as they are received at the network security system 102 and generates monitored network data describing the data packets. The monitoring module 302 gathers data from the data packets and records the data to generate the monitored network data. For example, the monitoring module 302 gathers data such as a source IP, destination IP, protocol, timestamp, device IDs, etc., from each command and records the gathered data.

In some embodiments the monitoring module 302 monitors network traffic during a period of time. For example, the monitoring module 302 monitors network traffic during a period time during which the devices are executing in a sandboxed testing environment. During the period of time, the network security system 102 may allow all received data packets to pass to their intended destination without restriction. For example, the network security system 102 allows the data packets to be transmitted to their intended recipient without considering a set of security policies.

The data set identification module 304 identifies sets of commands from the monitored network data. For example, the data set identification module 304 analyzes the monitored network data to identify sets of commands based on one or more criteria such as source IP address, destination IP address, time, command type, etc. In some embodiments, the data set identification module 304 identifies a set of commands in the monitored network data that were transmitted between two devices or two sets of devices. For example, the data set identification module 304 identifies all commands in the monitored network data that include a specified source IP address and a specified destination IP address, or vice versa. As another example, the data set identification module 304 identifies all commands from the monitored network data that include one of a specified group of source IP addresses and one of a specified group of destination IP addresses, or vice versa.

In some embodiments, the data set identification module 304 identifies a set of commands from the monitored network data based on multiple criteria, such as command transmitted during a specified time period and from/to a specified destination and source IP address. As another example, the data set identification module 304 identifies a set of commands from the monitored network data based on the time that the commands were transmitted and the command type (e.g., IT command, OT command, read command, write command, etc.).

The command group analysis module 306 analyzes predetermined command groups based on the sets of commands identified by the data set identification module 304. Each predetermined command group includes a listing of related commands, such as commands that are commonly used to provide specified services, similar commands (e.g., read command, write commands, administer commands), etc. The predetermined command groups are manually generated by an administrator and used to automate generation of network security policies (e.g., whitelisting policies). For example, rather than an administrator manually adding commands to a whitelisting policy, the policy generation module 118 identifies a predetermined command group that should be applied and generates a policy based on the listing of commands in the predetermined command group.

The command group analysis module 306 analyzes the predetermined command groups to identify predetermined command groups that include commands that are also included in a set of commands identified by the data set identification module 304. In some embodiments, the command group analysis module 306 identifies any predetermined command group that includes at least one command that is also included in a set of commands identified by the data set identification module 304. Alternatively, the command group analysis module 306 identifies predetermined command groups that include at least a threshold number of commands that are also included in the set of command identified by the data set identification module 304, such as at least 2, 3, 4, etc., commands.

The command group selection module 308 determines whether a command group identified by the command group analysis module 306 should be used to implement a policy. To accomplish this, the command group selection module 308 determines whether a set of commands identified by the data set identification module 304 includes a threshold number of commands from the predetermined command group identified by the command group analysis module 306. For example, in some embodiments, the command group selection module 308 determines a number of unique command from the predetermined command group that are included in the set of commands identified by the data set identification module 304. The number of unique commands indicates the number of commands from the predetermined command group that are included at least once in the set of commands identified by the data set identification module 304.

The command group selection module 308 compares the unique number of commands to a threshold number of commands to determine whether to use the predetermined command group to generate a policy. For example, if the number of unique command meets or exceeds the threshold number, the command group selection module 308 determines to use the predetermined command group to generate a policy. Alternatively, if the number of unique command does not meet or exceeds the threshold number, the command group selection module 308 determines to that the predetermined command group should not be used to generate a policy.

In some embodiments, the unique number of commands indicates the number of commands from the predetermined command group that are included at least a threshold number of times in the set of command. For example, the unique number of commands indicates the number of commands from the predetermined command group that are included in the set of commands at least 10 times.

In some embodiments, the command group selection module 308 determines whether the predetermined command group includes a threshold percentage of commands from the set of commands identified by the data set identification module 304, or vice versa. For example, the command group selection module 308 determines a percentage of the unique commands from the set of commands that are included in the predetermined command group and compares the percentage to a threshold percentage. Alternatively, the command group selection module 308 determines a percentage of the commands in the predetermined command group that are included in the set of commands identified by the data set identification module 304. The command group selection module 308 then compares this percentage to a threshold percentage.

In some embodiments, the command group selection module 308 determines the total number of occurrences of commands from the predetermined command group that are included in the set of commands. The total number of occurrences of commands indicates a total number of times that commands from the predetermined command group appear in the set of commands identified by the data set identification module 304. In this type of embodiment, the command group selection module 308 counts the number of times a command is detected, even if the command is repeated multiple times in the set of commands identified by the data set identification module 304. Thus, the same command will be counted for each separate occurrence of the command.

The command group selection module 308 compares the total number of occurrences of commands to a threshold number of commands to determine whether to use the predetermined command group to generate a policy. For example, if the total number of occurrences of commands meets or exceeds the threshold number, the command group selection module 308 determines to use the predetermined command group to generate a policy. Alternatively, if the total number of occurrences of commands does not meet or exceeds the threshold number, the command group selection module 308 determines to that the predetermined command group should not be used to generate a policy.

The policy generation module 310 generates a policy to be used by the network security system 102 based on the predetermined command groups selected by the command group selection module 308. For example, the policy generation module 310 adds the listing of commands included in the predetermined command group to a whitelisting policy to be used by the command group selection module 308. In some embodiments, this includes simply using the listing of commands to generated a whitelisting policy that applies to all data communications received by the network security system 102. Alternatively, the policy generation module 310 generates a policy that applies to a subset of data traffic received by the network security system 102. For example, the policy generation module 310 generates a policy that applies to communications transmitted between specified devices, during specified times of the day, that are a specified protocol, etc.

In some embodiments, the policy generation module 310 uses the criteria used by the data set identification module 304 to determine the set of commands to generate the policy. For example, if the data set identification module 304 used a specified source and destination IP address to determine the set of commands, the policy generation module 310 uses the same specified source and destination IP address to generate the resulting policy. As a result, a set of commands that were transmitted between two devices or two sets of devices will be used to generate a policy that applies to future communications between the two devices or the two sets of devices.

In some embodiments, the policy generation module 310 generates a policy even when a predetermined command group is not selected by the command group selection module 308. For example, in the event that the command group selection module 308 determines that a set of commands identified by the data set identification module 304 does not meet a threshold number of commands from a predetermined command group, the policy generation module 310 may generate a policy based on only the commands in the set of commands identified by the data set identification module 304. Thus, the new policy generated by the policy generation module 310 would include the commands in the set of commands identified by the data set identification module 304 rather than the entire listing of commands included in a predetermined command group.

Figure 4:
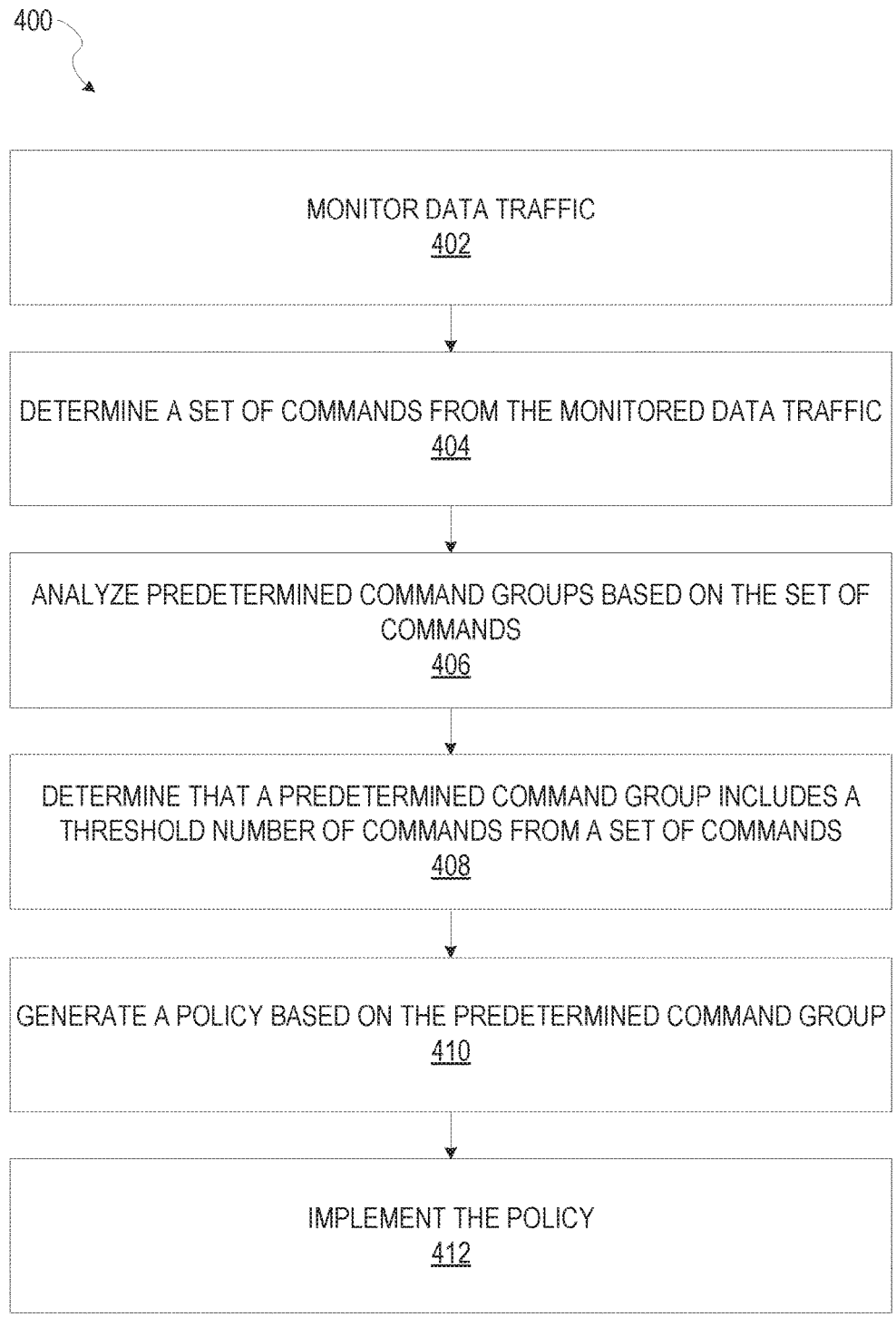
FIG. 4 is a flowchart illustrating a method for network security configuration based on predetermined command groups, according to certain example embodiments.

FIG. 4 is a flowchart illustrating a method 400 for network security configuration based on predetermined command groups, according to certain example embodiments. The method 400 may be embodied in computer-readable instructions for execution by one or more computer processors such that the operations of the method 400 may be performed in part or in whole by the network security system 102; accordingly, the method 400 is described below by way of example with reference thereto. However, it shall be appreciated that at least some of the operations of the method 400 may be deployed on various other hardware configurations and the method 400 is not intended to be limited to the network security system 102.

At operation 402, the monitoring module 302 monitors data traffic. Network traffic includes data packets transmitted from devices in both networks 104 and 106. The data packets are transmitted as the devices communicate with each other to provide services, such as software services. For example, the data packets represent a plurality of commands transmitted from one device to another device, such as read, write or administer commands.

The monitoring module 302 analyzes the data packets as they are received at the network security system 102 and generates monitored network data describing the data packets. The monitoring module 302 gathers data from the data packets and records the data to generate the monitored network data. For example, the monitoring module 302 gathers data such as a source IP, destination IP, protocol, timestamp, device IDs, etc., from each command and records the gathered data.

In some embodiments the monitoring module 302 monitors network traffic during a period of time. For example, the monitoring module 302 monitors network traffic during a period of time during which the devices are executing in a sandboxed testing environment. During the period of time, the network security system 102 may allow all received data packets to pass to their intended destination without restriction. For example, the network security system 102 allows the data packets to be transmitted to their intended recipient without considering a set of security policies.

At operation 404, the data set identification module 304 determines a set of commands from the monitored data traffic based on one or more criteria such as source IP address, destination IP address, time, command type, etc. In some embodiments, the data set identification module 304 identifies a set of commands in the monitored network data that were transmitted between two devices or two sets of devices. For example, the data set identification module 304 identifies all commands in the monitored network data that include a specified source IP address and a specified destination IP address, or vice versa. As another example, the data set identification module 304 identifies all commands from the monitored network data that include one of a specified group of source IP addresses and one of a specified group of destination IP addresses, or vice versa.

In some embodiments, the data set identification module 304 identifies a set of commands from the monitored network data based on multiple criteria, such as command transmitted during a specified time period and from/to a specified destination and source IP address. As another example, the data set identification module 304 identifies a set of commands from the monitored network data based on the time that the commands were transmitted and the command type (e.g., read command, write command, administer command, etc.).

At operation 406, the command group analysis module 306 analyzes the predetermined command groups based on the set of commands. The command group analysis module 306 analyzes the predetermined command groups to identify predetermined command groups that include commands that are also included in a set of commands identified by the data set identification module 304. In some embodiments, the command group analysis module 306 identifies any predetermined command group that includes at least one command that is also included in a set of commands identified by the data set identification module 304. Alternatively, the command group analysis module 306 identifies predetermined command groups that include at least a threshold number of commands that are also included in the set of command identified by the data set identification module 304, such as at least 2, 3, 4, etc., commands.

At operations 408, the command group selection module 308 determines that a predetermined command group includes a threshold number of commands from the set of commands. For example, the command group selection module 308 determines whether a number of unique commands from the predetermined command group are included in the set of commands. As another example, the command group selection module 308 determines whether a total number of occurrences of commands from the predetermined command group are included in the set of commands. This operation is discussed in greater detail in relation to FIGS. 5 and 6 below.

At operation 410, the policy generation module 310 generates a policy based on the predetermined command group. For example, the policy generation module 310 adds the listing of commands included in the predetermined command group to a whitelisting policy to be used by the network security system 102. In some embodiments, this includes using the listing of commands to generate a whitelisting policy that applies to all data communications received by the network security system 102. Alternatively, the policy generation module 310 generates a policy that applies to a subset of data traffic received by the network security system 102. For example, the policy generation module 310 generates a policy that applies to communications transmitted between specified devices, during specified times of the day, that are a specified protocol, etc.

In some embodiments, the policy generation module 310 uses the criteria used by the data set identification module 304 to determine the set of commands to generate the policy. For example, if the data set identification module 304 used a specified source and destination IP address to determine the set of commands, the policy generation module 310 uses the same specified source and destination IP address to generate the resulting policy. As a result, a set of commands that were transmitted between two devices or two sets of devices will be used to generate a policy that applies to future communications between the two devices or the two sets of devices.

At operation 412, the management module 112 implements the policy. Accordingly, data communications received by the network security system 102 will be monitored based on the implemented policy. For example, command that are included in the whitelist policy will be allowed to pass to their intended recipient.

Figure 5:
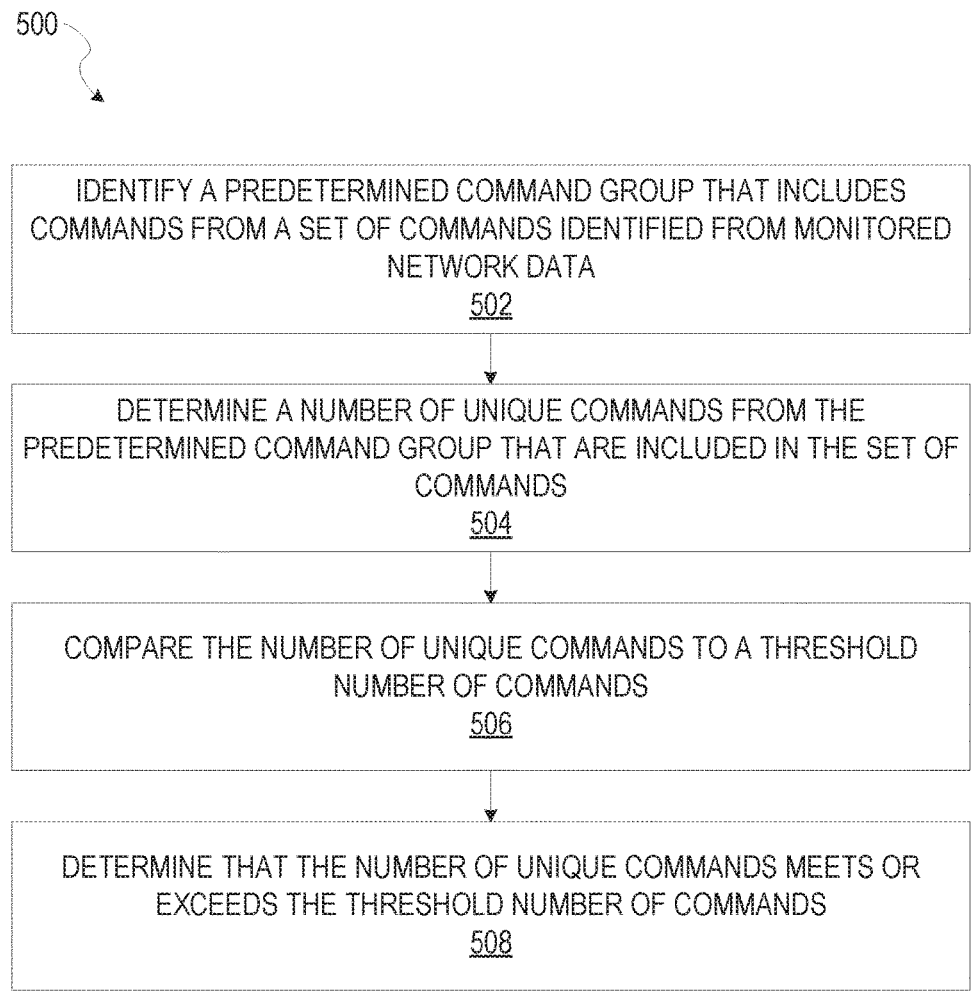
FIG. 5 is a flowchart illustrating a method for determining that a predetermined command group includes a threshold number of commands from a set of commands, according to certain example embodiments.

FIG. 5 is a flowchart illustrating a method 500 for determining that a predetermined command group includes a threshold number of commands from a set of commands, according to certain example embodiments. The method 500 may be embodied in computer-readable instructions for execution by one or more computer processors such that the operations of the method 500 may be performed in part or in whole by the policy generation module 118; accordingly, the method 500 is described below by way of example with reference thereto. However, it shall be appreciated that at least some of the operations of the method 500 may be deployed on various other hardware configurations and the method 500 is not intended to be limited to the policy generation module 118.

At operation 502, the command group analysis module 306 identifies a predetermined command group that includes commands from a set of commands identified from monitored network data. Each predetermined command group includes a listing of related commands, such as commands that are commonly used to provide specified services, similar commands (e.g., read command, write commands, administer commands), etc.

The command group analysis module 306 analyzes the predetermined command groups to identify predetermined command groups that include commands that are also included in a set of commands identified by the data set identification module 304. In some embodiments, the command group analysis module 306 identifies any predetermined command group that includes at least one command that is also included in a set of commands identified by the data set identification module 304. Alternatively, the command group analysis module 306 identifies predetermined command groups that include at least a threshold number of commands that are also included in the set of command identified by the data set identification module 304, such as at least 2, 3, 4, etc., commands.

At operation 504, the command group selection module 308 determines a number of unique commands from the predetermined command group that are included in the set of commands. The number of unique commands indicates the number of commands from the predetermined command group that are included at least once in the set of commands identified by the data set identification module 304. In some embodiments, the unique number of commands indicates the number of commands from the predetermined command group that are included at least a threshold number of times in the set of command. For example, the unique number of commands indicates the number of commands from the predetermined command group that are included in the set of commands at least 10 times.

At operation 506, the command group selection module 308 compares the number of unique commands to a threshold number of commands to determine whether to use the predetermined command group to generate a policy. For example, if the number of unique command meets or exceeds the threshold number, the command group selection module 308 determines to use the predetermined command group to generate a policy. Alternatively, if the number of unique command does not meet or exceeds the threshold number, the command group selection module 308 determines to that the predetermined command group should not be used to generate a policy.

At operation 508, the command group selection module 308 determines that the number of unique commands meets or exceeds the threshold number of commands. Accordingly, the predetermined command group will be used to generate a policy.

Figure 6:
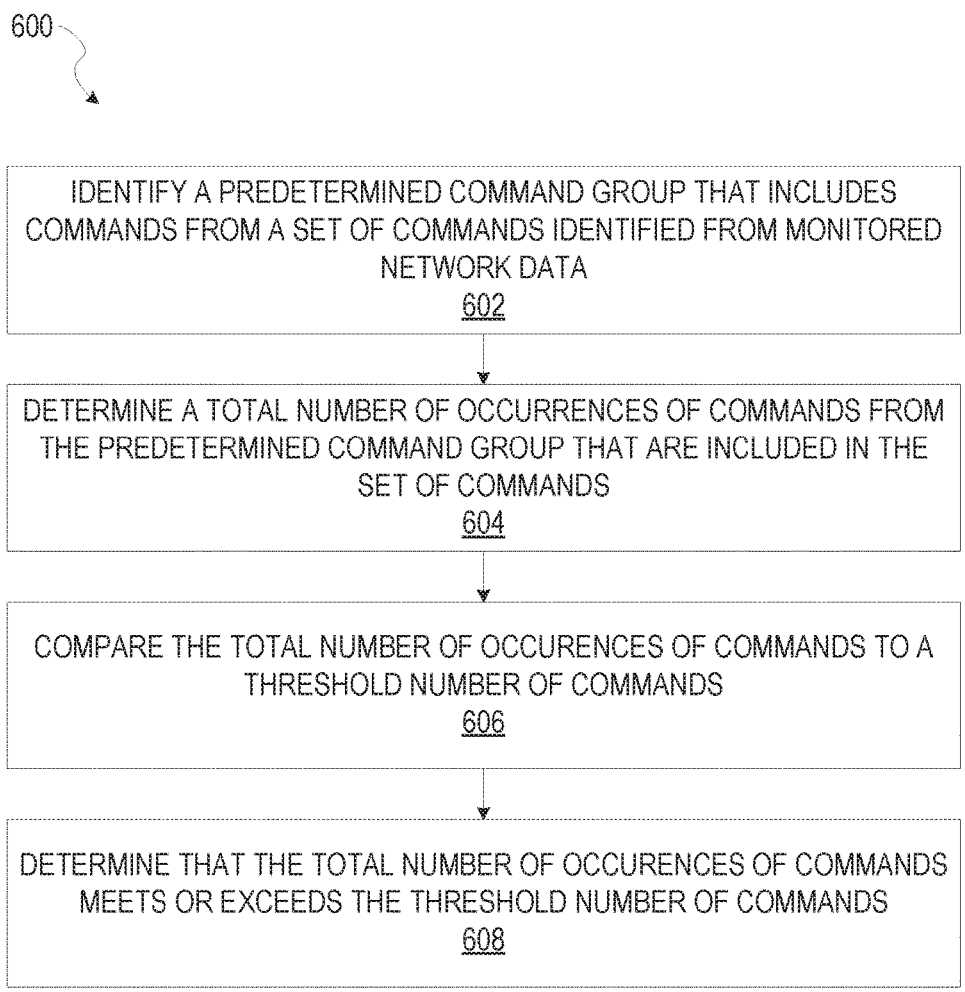
FIG. 6 is a flowchart illustrating a method for determining that a predetermined command group includes a threshold number of commands from a set of commands, according to certain example embodiments.

FIG. 6 is a flowchart illustrating a method 600 for determining that a predetermined command group includes a threshold number of commands from a set of commands, according to certain example embodiments. The method 600 may be embodied in computer-readable instructions for execution by one or more computer processors such that the operations of the method 600 may be performed in part or in whole by the policy generation module 118; accordingly, the method 600 is described below by way of example with reference thereto. However, it shall be appreciated that at least some of the operations of the method 600 may be deployed on various other hardware configurations and the method 600 is not intended to be limited to the policy generation module 118.

At operation 602, the command group analysis module 306 identifies a predetermined command group that includes commands from a set of commands identified from monitored network data. Each predetermined command group includes a listing of related commands, such as commands that are commonly used to provide specified services, similar commands (e.g., read command, write commands, administer commands), etc.

The command group analysis module 306 analyzes the predetermined command groups to identify predetermined command groups that include commands that are also included in a set of commands identified by the data set identification module 304. In some embodiments, the command group analysis module 306 identifies any predetermined command group that includes at least one command that is also included in a set of commands identified by the data set identification module 304. Alternatively, the command group analysis module 306 identifies predetermined command groups that include at least a threshold number of commands that are also included in the set of command identified by the data set identification module 304, such as at least 2, 3, 4, etc., commands.

At operation 604, the command group selection module 308 determines a total number of occurrences of commands from the predetermined command group that are included in the set of commands. The total number of occurrences of commands indicates a total number of times that commands from the predetermined command group appear in the set of commands identified by the data set identification module 304. In this type of embodiment, the command group selection module 308 counts the number of times a command is detected, even if the command is repeated multiple times in the set of commands identified by the data set identification module 304.

At operation 606, the command group selection module 308 compares the total number of occurrences of commands to a threshold number of commands to determine whether to use the predetermined command group to generate a policy. For example, if the total number of occurrences of commands meets or exceeds the threshold number, the command group selection module 308 determines to use the predetermined command group to generate a policy. Alternatively, if the total number of occurrences of commands does not meet or exceeds the threshold number, the command group selection module 308 determines to that the predetermined command group should not be used to generate a policy.

At operation 608, the command group selection module 308 determines that the total number of occurrences of commands meets or exceeds the threshold number of commands. Accordingly, the predetermined command group will be used to generate a policy.

Example Software Architecture

Figure 7:
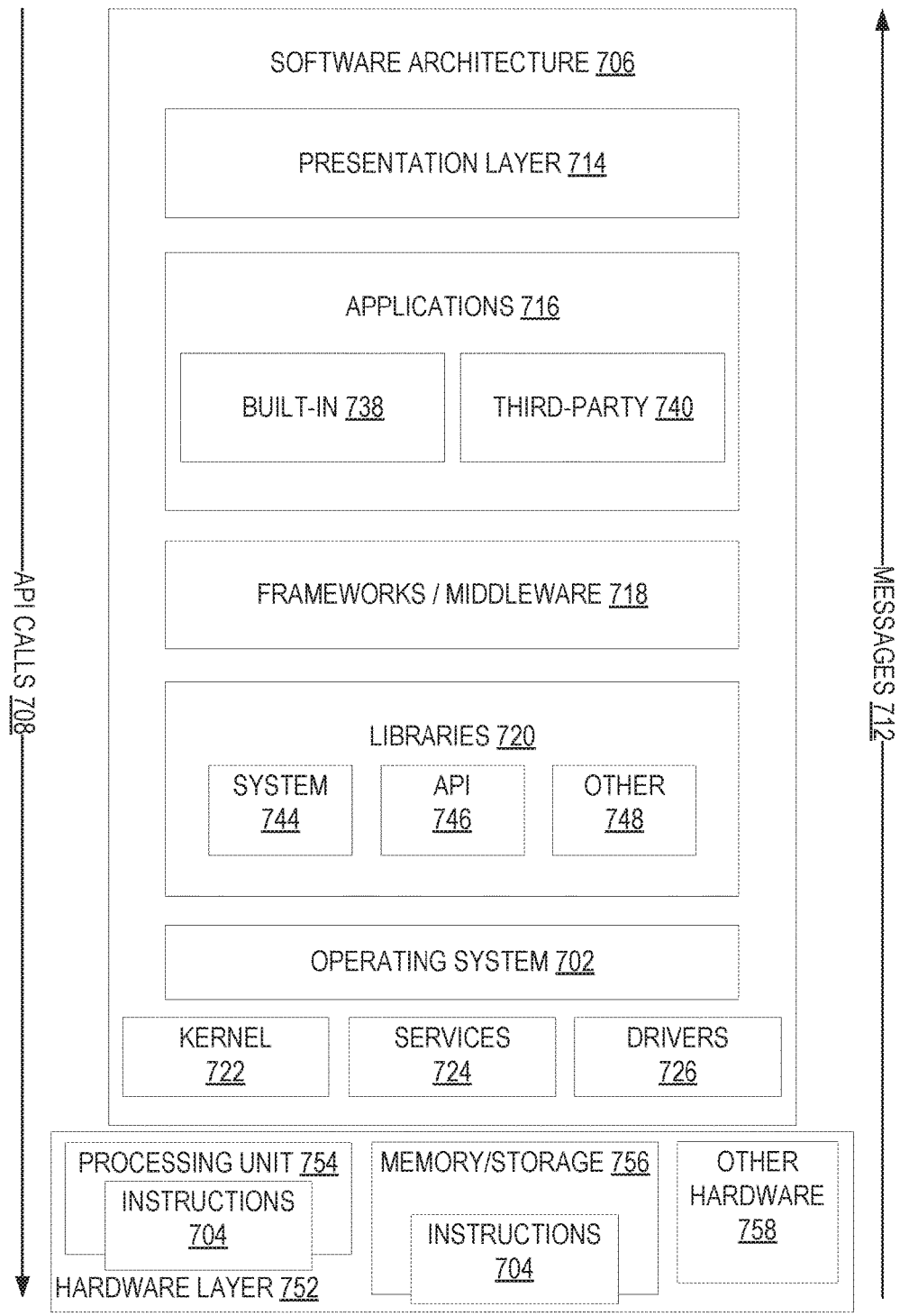
FIG. 7 is a block diagram illustrating an example software architecture, which may be used in conjunction with various hardware architectures herein described.

FIG. 7 is a block diagram illustrating an example software architecture 706, which may be used in conjunction with various hardware architectures herein described. FIG. 7 is a non-limiting example of a software architecture and it will be appreciated that many other architectures may be implemented to facilitate the functionality described herein. The software architecture 706 may execute on hardware such as machine 800 of FIG. 8 that includes, among other things, processors 804, memory 814, and I/O components 818. A representative hardware layer 752 is illustrated and can represent, for example, the machine 800 of FIG. 8. The representative hardware layer 752 includes a processing unit 754 having associated executable instructions 704. Executable instructions 704 represent the executable instructions of the software architecture 706, including implementation of the methods, components and so forth described herein. The hardware layer 752 also includes memory and/or storage modules memory/storage 756, which also have executable instructions 704. The hardware layer 752 may also comprise other hardware 758.

In the example architecture of FIG. 7, the software architecture 706 may be conceptualized as a stack of layers where each layer provides particular functionality. For example, the software architecture 706 may include layers such as an operating system 702, libraries 720, applications 716 and a presentation layer 714. Operationally, the applications 716 and/or other components within the layers may invoke Application Programming Interface (API) calls 708 through the software stack and receive a response 712 as in response to the API calls 708. The layers illustrated are representative in nature and not all software architectures have all layers. For example, some mobile or special purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 720 provide a common infrastructure that is used by the applications 716 and/or other components and/or layers. The libraries 720 provide functionality that allows other software components to perform tasks in an easier fashion than to interface directly with the underlying operating system 702 functionality (e.g., kernel 722, services 724 and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 (also sometimes referred to as middleware) provide a higher-level common infrastructure that may be used by the applications 716 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 716 and/or other software components/modules, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. Third-party applications 740 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 740 may invoke the API calls 708 provided by the mobile operating system (such as operating system 702) to facilitate functionality described herein.

The applications 716 may use built in operating system functions (e.g., kernel 722, services 724, and/or drivers 726), libraries 720, and frameworks/middleware 718 to create user interfaces to interact with users of the system. Alternatively, or additionally, in some systems interactions with a user may occur through a presentation layer, such as presentation layer 714. In these systems, the application/component "logic" can be separated from the aspects of the application/component that interact with a user.

Example Machine Architecture and Machine-Readable Medium

Figure 8:
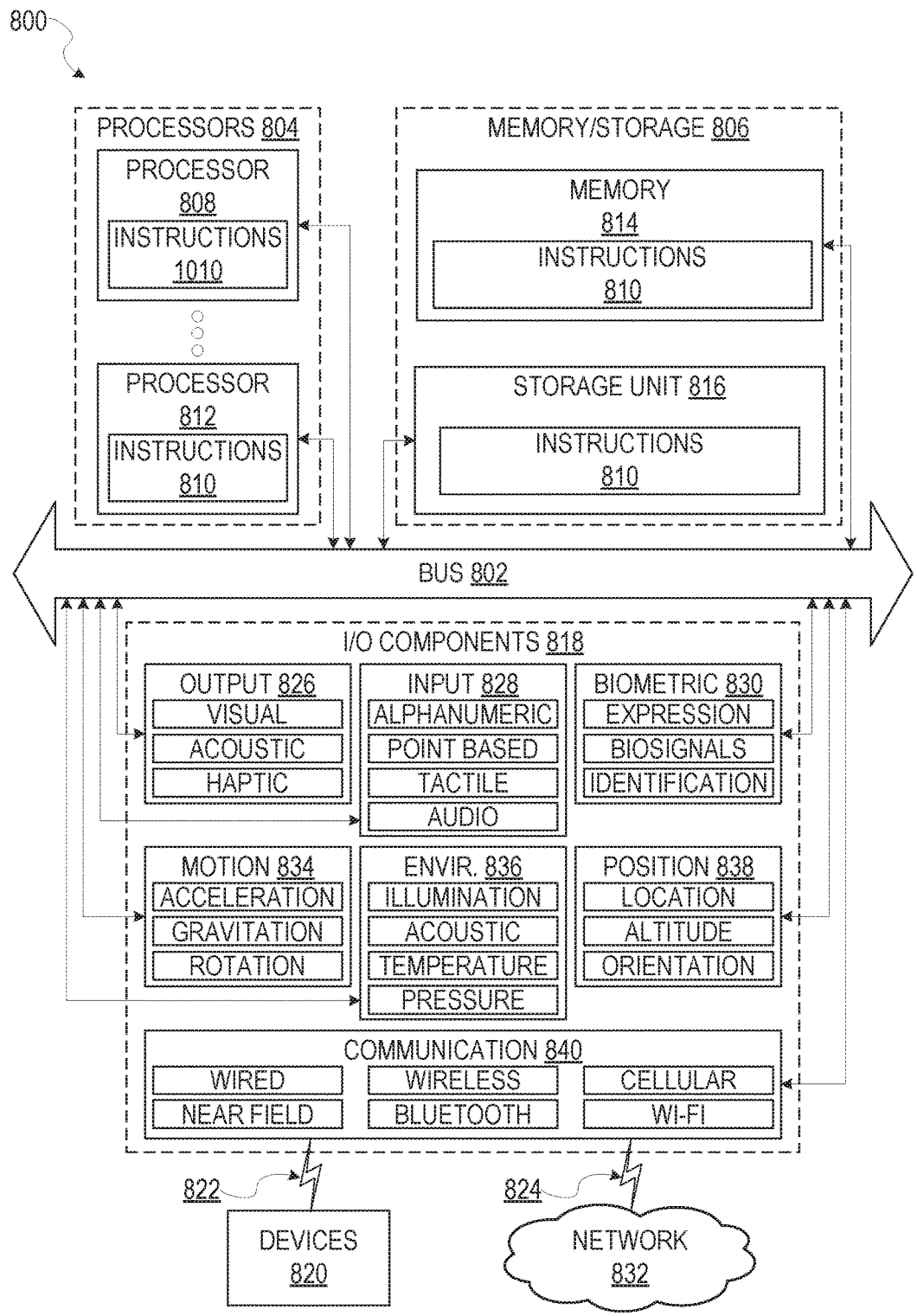
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 810, sequentially or otherwise, that specify actions to be taken by machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory memory/storage 806, and I/O components 818, which may be configured to communicate with each other such as via a bus 802. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

The I/O components 818 may include a wide variety of components to receive input, provide output, produce output, transmit information, exchange information, capture measurements, and so on. The specific I/O components 818 that are included in a particular machine 800 will depend on the type of machine. For example, portable machines such as mobile phones will likely include a touch input device or other such input mechanisms, while a headless server machine will likely not include such a touch input device. It will he appreciated that the I/O components 818 may include many other components that are not shown in FIG. 8. The I/O components 818 are grouped according to functionality merely for simplifying the following discussion and the grouping is in no way limiting. In various example embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 818 may include biometric components 830, motion components 834, environmental components 836, or position components 838 among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 838 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via coupling 822 and coupling 824, respectively. For example, the communication components 840 may include a network interface component or other suitable device to interface with the network 832. In further examples, communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as, location via IP geo-location, location via Wi-Fi® signal triangulation, location via detecting a NFC beacon signal that may indicate a particular location, and so forth.

Transmission Medium

In various example embodiments, one or more portions of the network 832 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 832 or a portion of the network 832 may include a wireless or cellular network and the coupling 824 may be a Code Division Multiple Access (CDMA) connection, a Global System for Mobile communications (GSM) connection, or another type of cellular or wireless coupling. In this example, the coupling 824 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 810 may be transmitted or received over the network 832 using a transmission medium via a network interface device (e.g., a network interface component included in the communication components 840) and utilizing any one of a number of well-known transfer protocols (e.g., HTTP). Similarly, the instructions 810 may be transmitted or received using a transmission medium via the coupling 822 (e.g., a peer-to-peer coupling) to the devices 820. The term "transmission medium" shall be taken to include any intangible medium that is capable of storing, encoding, or carrying the instructions 810 for execution by the machine 800, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   monitoring data traffic transmitted between a first device and a second device in a network to identify a plurality of commands transmitted between the first device and the second device;
   determining, from the plurality of commands, a first set of commands that were transmitted between the first device and the second device and a count of the first set of commands;
   determining a predetermined threshold;
   providing a first predetermined command group, the first predetermined command group including a list of electronic commands and not a list of devices;
   determining, using at least one hardware processor, that the first set of commands includes a threshold number of commands represented within the first predetermined command group, the threshold number of commands exceeding the predetermined threshold; and
   dynamically generating, by the at least one hardware processor, a first policy based on the first predetermined command group;
   wherein the first policy allows all commands in the command group to be transmitted between the first device and the second device.

2. The method of claim 1, wherein determining that the first set of commands includes the threshold number of commands from the first predetermined command group comprises:
   determining a number of unique commands from the first predetermined command group that were used in communications between the first device and the second device; and
   comparing the number of unique commands to the threshold number of commands.

3. The method of claim 1, wherein determining that the first set of commands includes the threshold number of commands from the first predetermined command group comprises:
   determining a total number of occurrences of commands from the first predetermined command group that were transmitted between the first device and the second device; and
   comparing the total number of occurrences of commands to the threshold number of commands.

4. The method of claim 1, wherein the first policy is a whitelisting policy for communications transmitted between the first device and the second device, the whitelisting policy including the listing of the plurality of commands for the first predetermined command group.

5. The method of claim 1, further comprising:
   implementing the first policy to subsequent data traffic transmitted between the first device and the second device.

6. A method comprising:
   monitoring data traffic transmitted between a first device and a second device in a network to identify a plurality of commands transmitted between the first device and the second device;
   determining, from the plurality of commands, a first set of commands that were transmitted between the first device and the second device;
   determining, using at least one hardware processor, that the first set of commands includes a threshold number of commands from a first predetermined command group of a plurality of predetermined command groups, each predetermined command group including a listing of a plurality of commands; and
   generating, by the at least one hardware processor, a first policy based on the first predetermined command group
   wherein determining the first set of commands that were transmitted between the first device and the second device comprises:
   searching the plurality of commands transmitted between the first device and the second device for commands originating from a first IP address and being transmitted to a second IP address, yielding a first subset of commands;
   searching the plurality of commands transmitted between the first device and the second device for commands originating from the second IP address and being transmitted to the first IP address, yielding a second subset of commands; and
   determining the first set of commands based on the first subset of commands and the second subset of commands.

7. The method of claim 6, further comprising:
   identifying from the first subset of commands and the second subset of commands, a set of commands transmitted within a specified period of time, wherein at least one command from the first subset of commands that was not transmitted within the specified period of time is not included in the first set of commands.

8. A network security system comprising:
   one or more computer processors; and
   one or more computer-readable mediums storing instructions that, when executed by the one or more computer processors, cause the network security system to perform operations comprising:
   monitoring data traffic transmitted between a first device and a second device in a network to identify a plurality of commands transmitted between the first device and the second device;
   determining, from the plurality of commands, a first set of commands that were transmitted between the first device and the second device and a count of the first set of commands;
   determining a predetermined threshold;
   providing a first predetermined command group, the first predetermined command group including a list of electronic commands and not a list of devices;
   determining that the first set of commands includes a threshold number of commands represented within the first predetermined command group, the threshold number of commands exceeding the predetermined threshold; and
   dynamically generating a first policy based on the first predetermined command group;
   wherein the first policy allows all commands in the command group to be transmitted between the first device and the second device.

9. The network security system of claim 8, wherein determining that the first set of commands includes the threshold number of commands from the first predetermined command group comprises:

determining a percentage of commands from the first predetermined command group that are included in the first set of commands; and comparing the percentage to a threshold percentage.

10. The network security system of claim 8, wherein determining that the first set of commands includes the threshold number of commands from the first predetermined command group comprises:

determining a total number of occurrences of commands from the first predetermined command group that were transmitted between the first device and the second device; and comparing the total number of occurrences of commands to the threshold number of commands.

11. The network security system of claim 8, wherein the first policy is a whitelisting policy for communications transmitted between the first device and the second device, the whitelisting policy including the listing of the plurality of commands for the first predetermined command group.

12. The network security system of claim 8, the operations further comprising:

implementing the first policy to subsequent data traffic transmitted between the first device and the second device.

13. A network security system comprising:

one or more computer processors; and one or more computer-readable mediums storing instructions that, when executed by the one or more computer processors, cause the network security system to perform operations comprising:

monitoring data traffic transmitted between a first device and a second device in a network to identify a plurality of commands transmitted between the first device and the second device;

determining, from the plurality of commands, a first set of commands that were transmitted between the first device and the second device;

determining that the first set of commands includes a threshold number of commands from a first predetermined command group of a plurality of predetermined command groups, each predetermined command group including a listing of a plurality of commands; and generating a first policy based on the first predetermined command group;

wherein determining the first set of commands that were transmitted between the first device and the second device comprises:

searching the plurality of commands transmitted between the first device and the second device for commands originating from a first IP address and being transmitted to a second IP address, yielding a first subset of commands;

searching the plurality of commands transmitted between the first device and the second device for commands originating from the second IP address and being transmitted to the first IP address, yielding a second subset of commands; and determining the first set of commands based on the first subset of commands and the second subset of commands.

14. The network security system of claim 13, the operations further comprising:

identifying from the first subset of commands and the second subset of commands, a set of commands transmitted within a specified period of time, wherein at least one command from the first subset of commands that was not transmitted within the specified period of time is not included in the first set of commands.

15. A non-transitory computer-readable medium storing instructions that, when executed by one or more computer processors of a network security system, cause the network security system to perform operations comprising:

monitoring data traffic transmitted between a first device and a second device in a network to identify a plurality of commands transmitted between the first device and the second device;

determining, from the plurality of commands, a first set of commands that were transmitted between the first device and the second device and a count of the first set of commands;

determining a predetermined threshold;

providing a first predetermined command group, the first predetermined command group including a list of electronic commands and not a list of devices;

determining that the first set of commands includes a threshold number of commands represented within the first predetermined command group, the threshold number of commands exceeding the predetermined threshold; and dynamically generating a first policy based on the first predetermined command group;

wherein the first policy allows all commands in the command group to be transmitted between the first device and the second device.

16. The non-transitory computer-readable medium of claim 15, wherein the operation of determining that the first set of commands includes the threshold number of commands from the first predetermined command group comprises:

determining a number of unique commands from the first predetermined command group that were used in communications between the first device and the second device; and comparing the number of unique commands to the threshold number of commands.

17. The non-transitory computer-readable medium of claim 15, wherein the operation of determining that the first set of commands includes the threshold number of commands from the first predetermined command group comprises: determining a total number of occurrences of commands from the first predetermined command group that were transmitted between the first device and the second device; and comparing the total number of occurrences of commands to the threshold number of commands.

18. The non-transitory computer-readable medium of claim 15, wherein the first policy is a whitelisting policy for communications transmitted between the first device and the second device, the whitelisting policy including the listing of commands for the first predetermined command group.

19. The non-transitory computer-readable medium of claim 15, wherein the instructions, when executed by the one or more computer processors, cause the network security system to perform operations further comprising:

identifying from the first subset of commands and the second subset of commands, a set of commands transmitted within a specified period of time, wherein at least one command from the first subset of commands that was not transmitted within the specified period of time is not included in the first set of commands.

20. A non-transitory computer-readable medium storing instructions that, when executed by one or more computer processors of a network security system, cause the network security system to perform operations comprising:
  monitoring data traffic transmitted between a first device and a second device in a network to identify a plurality of commands transmitted between the first device and the second device;
  determining, from the plurality of commands, a first set of commands that were transmitted between the first device and the second device;
  determining that the first set of commands includes a threshold number of commands from a first predetermined command group of a plurality of predetermined command groups, each predetermined command group including a listing of a plurality commands; and
  generating a first policy based on the first predetermined command group;
  wherein the operation of determining the first set of commands that were transmitted between the first device and the second device comprises:
  searching the plurality of commands transmitted between the first device and the second device for commands originating from a first IP address and being transmitted to a second IP address, yielding a first subset of commands;
  searching the plurality of commands transmitted between the first device and the second device for commands originating from the second IP address and being transmitted to the first IP address, yielding a second subset of commands; and
  determining the first set of commands based on the first subset of commands and the second subset of commands.

* * * * *